United States Patent [19]

St. Louis et al.

[11] 4,355,905
[45] Oct. 26, 1982

[54] ADJUSTABLE PLUG SEAL MECHANISM FOR HEAT TRANSFER ZONE SEPARATION IN HOLLOW SCREWS FOR EXTRUSION MACHINES

[75] Inventors: Harold E. St. Louis; Walter A. Trumbull, both of Midland, Mich.

[73] Assignee: The Dow Chemical Company, Midland, Mich.

[21] Appl. No.: 133,087

[22] Filed: Mar. 24, 1980

[51] Int. Cl.³ .......................... B01F 7/08; B28C 1/16; B29B 1/04
[52] U.S. Cl. ........................................ 366/79; 277/12; 277/152; 366/147; 366/318; 425/378 R; 425/379 R
[58] Field of Search ................... 366/79, 83, 144, 147, 366/318; 425/378 R, 379 R, 131.1, 143, 144, 376 B; 277/12, 152, 3, 27

[56] References Cited

U.S. PATENT DOCUMENTS 3,331,100 7/1967 Gould ............................. 425/379 R
3,588,956 6/1971 Poux et al. ....................... 425/379 R

*Primary Examiner*—Philip R. Coe
*Assistant Examiner*—Timothy F. Simone
*Attorney, Agent, or Firm*—R. B. Ingraham

[57] ABSTRACT

An easily-movable plug seal that is susceptible to quick and ready longitudinal adjustment in the central, lengthwise bore of an internally differentially heated (or cooled) extruder screw for sequentially diverse and distinct heat controlled zones within the extruder barrel is comprised of at least a single, cup-like member that is adequately flexible and supple to be flared laterally outwardly and urged into tight wall contact to make a sealing engagement against the internal screw bore wall upon pressurization of the interior of the plug seal member by the heat transfer fluid being passed into and applied within the screw.

12 Claims, 20 Drawing Figures

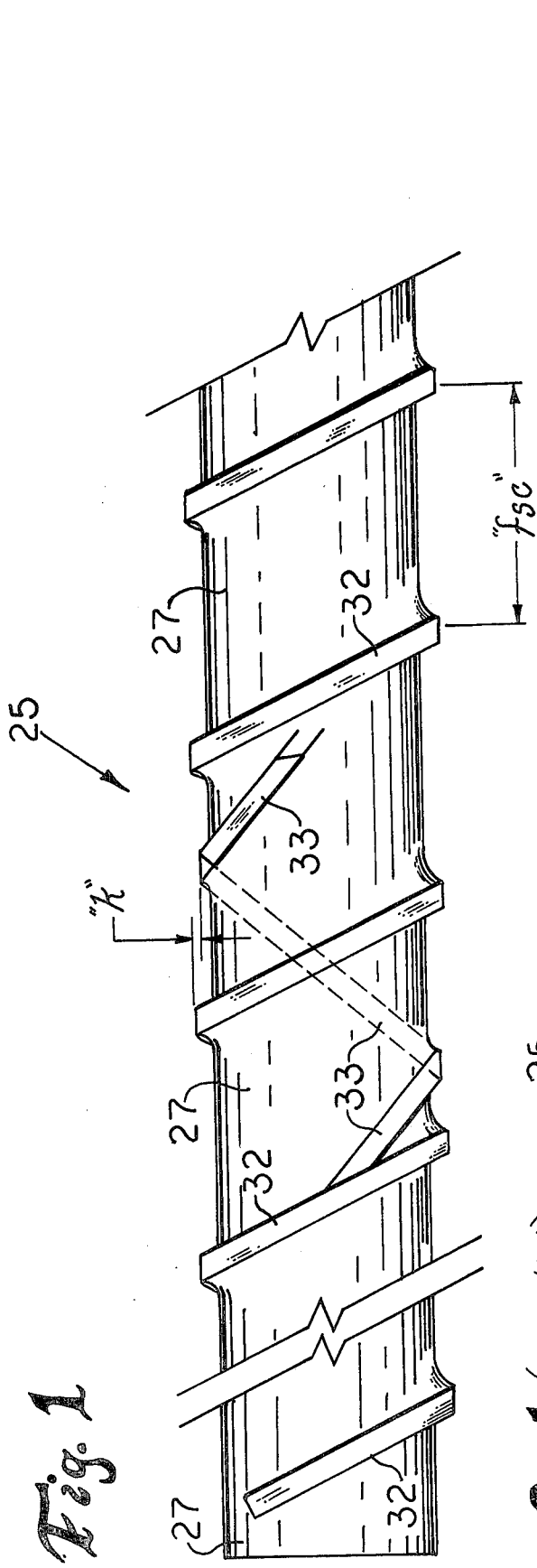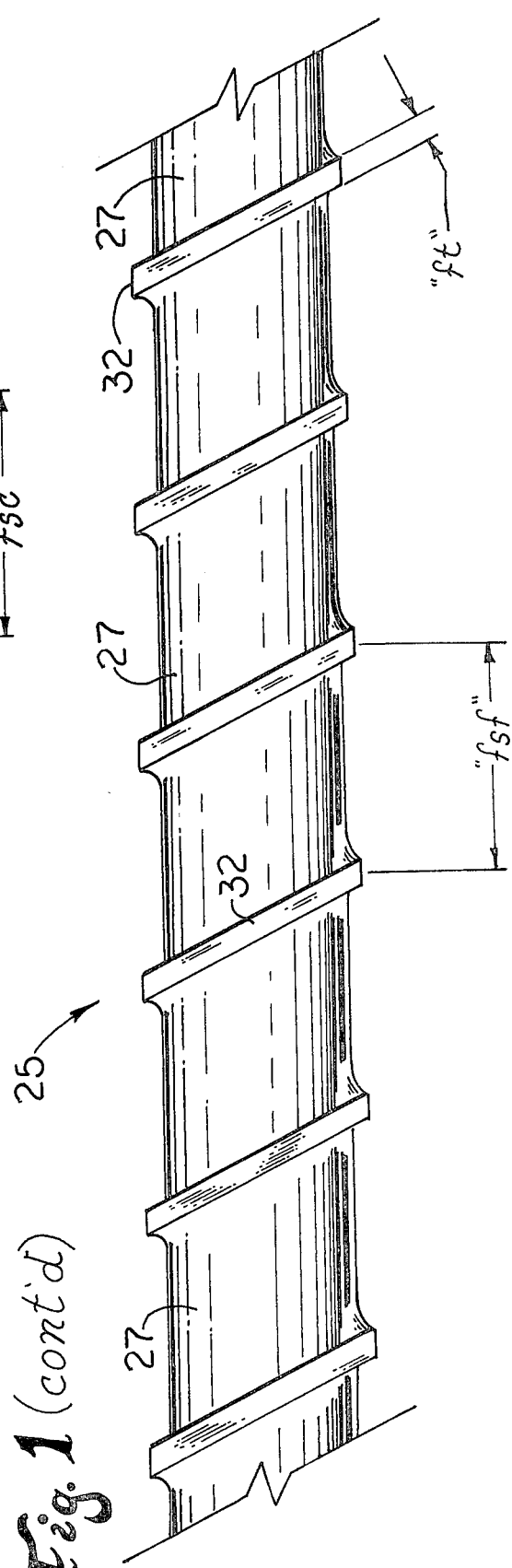

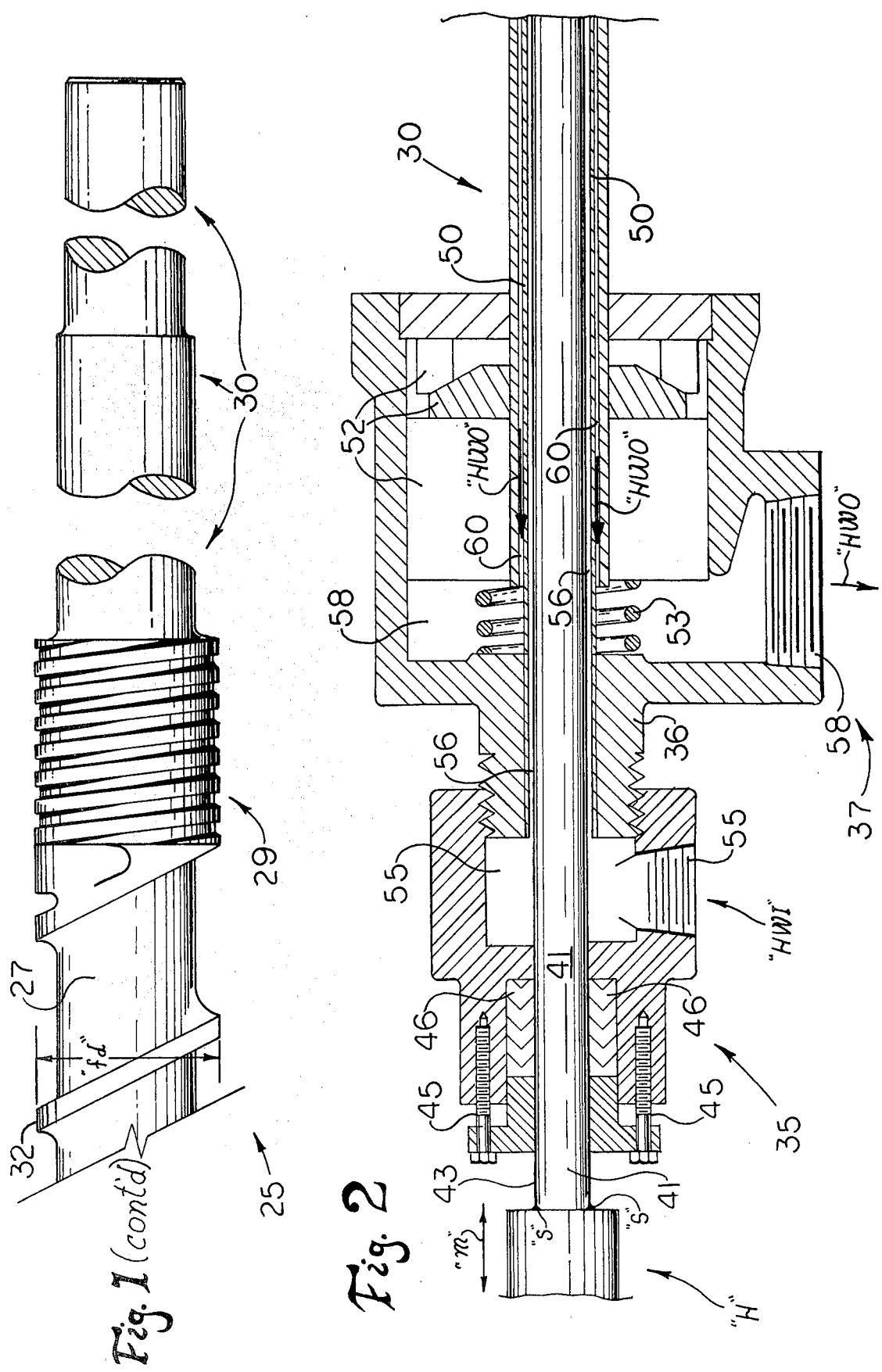

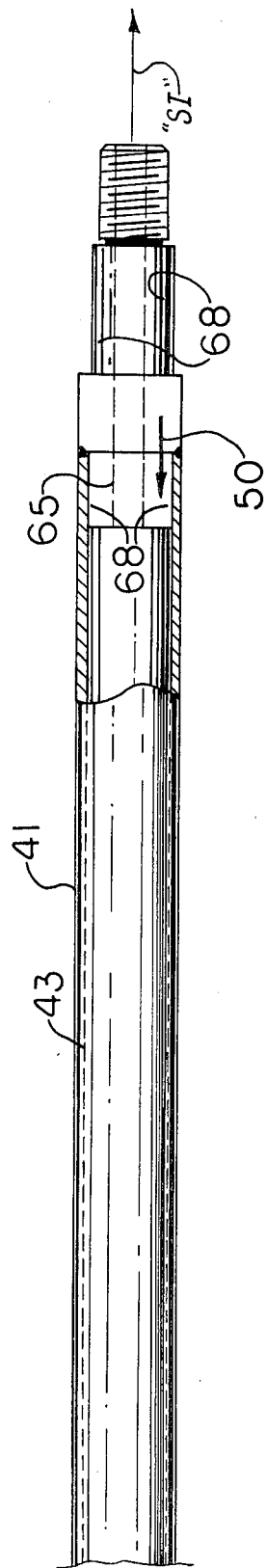

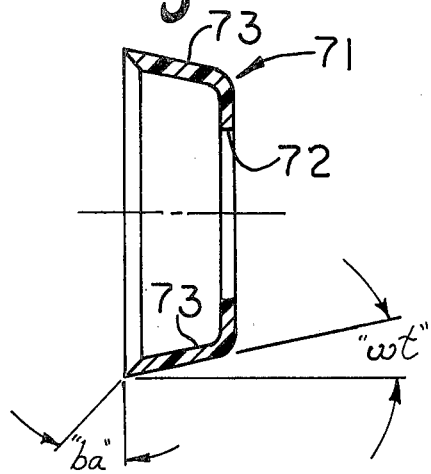
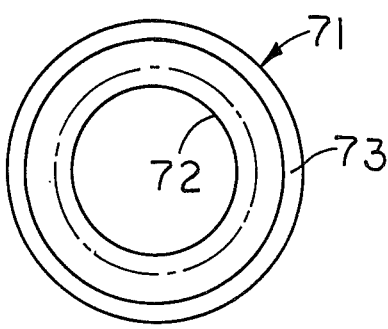
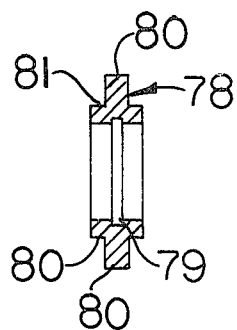
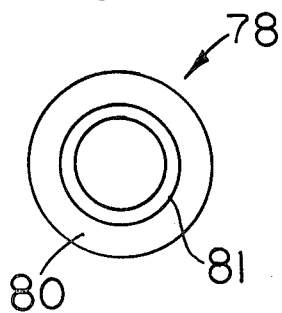
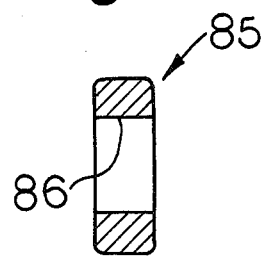
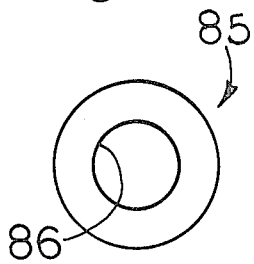
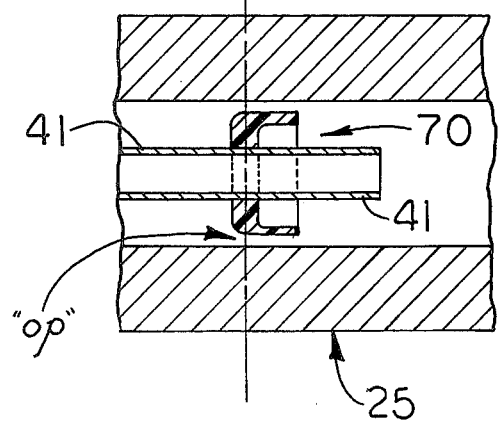
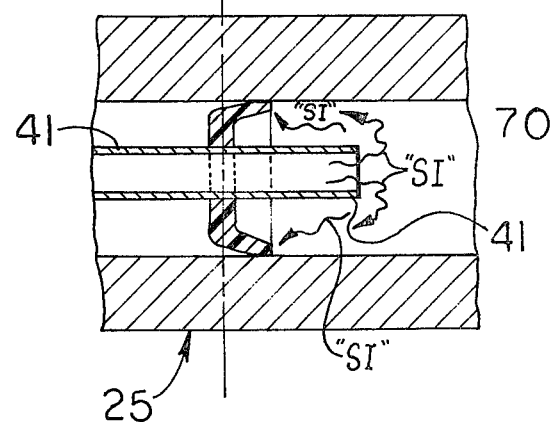

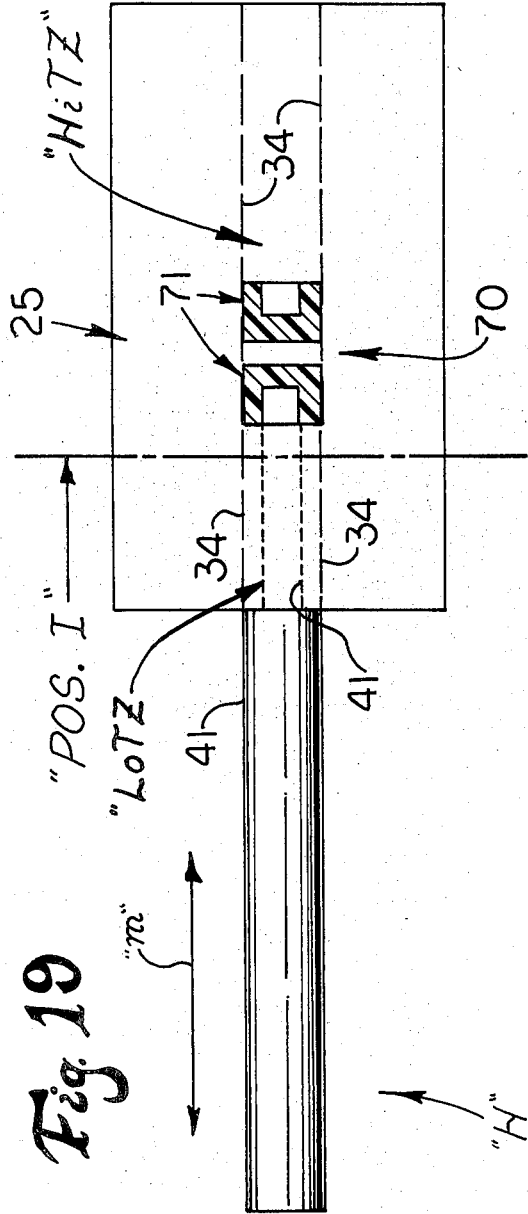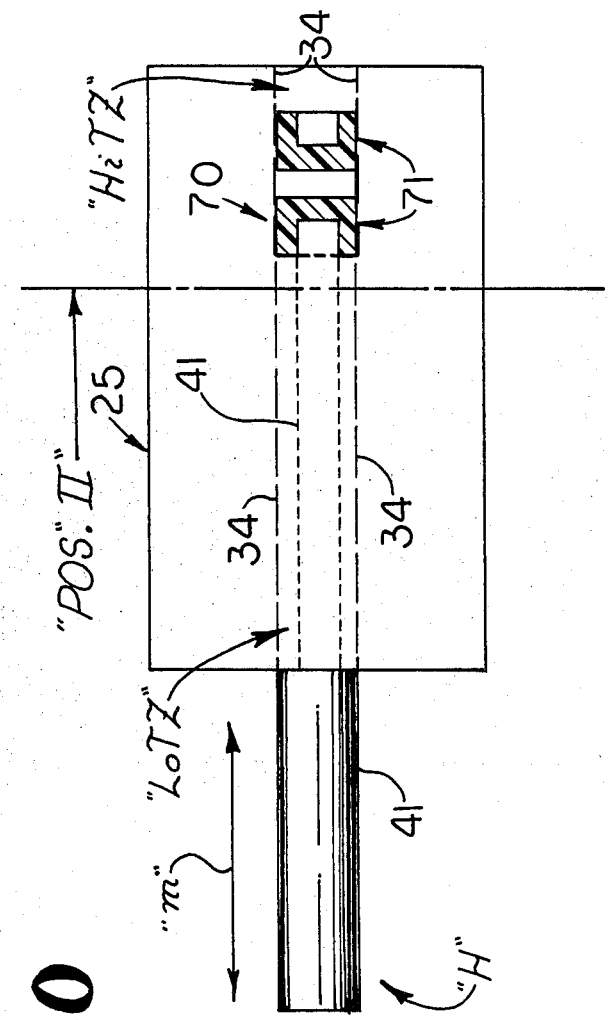

ADJUSTABLE PLUG SEAL MECHANISM FOR HEAT TRANSFER ZONE SEPARATION IN HOLLOW SCREWS FOR EXTRUSION MACHINES

BACKGROUND OF THE INVENTION

During typical extruding of many thermoplastics, particularly synthetic resinous materials, the extrusion apparatus utilized is so provided that both its barrel and the internal forwarding screw with which it is equipped are, relative to the temperature of the material being handled, either heated or cooled. This is most often and conveniently done by appropriate application of some heat-exchanging fluid medium (or separated media), such as water, steam and their likes or equivalents and so forth.

With the screw, the heat-exchanging fluid is internally passed through one or more given longitudinal interval lengths or zones in order to help obtain: (i) relatively uniform and effective temperature control and regulation of the plastic melt (or partial melt, depending on circumstance) being forwarded through the apparatus; and (ii) effective and rapid heat plastification of granular material fed to the screw extruder.

Plural distinct and separate heat exchange zones in the screw (quite often two) are popular and propitious. These may or may not be coextensive with and/or similarly or otherwise matched to corresponding heat-affecting and -transfer zones in the barrel of the given extruder in which the screw is situate. In any event: (i) the first of the heat-exchanging zones in the screw is generally beginning at or adjacent to the inlet for the granular or otherwise particulated material to be assimilated by the extruder; and (ii) the second or last of such zones is generally ending at or adjacent to the outlet or extrusion orifice of the extruder.

Employment of at least two heat-exchanging zones in the screw thermodynamically possibilitates: firstly, substantial enlargement of the initial heat input to the infeeding particulated thermoplastic material for quicker and more expedient melting influence thereon at or before the time the usually quite consequential mechanical, heat-inducing working thereof by the screw contributes to its liquefying transformation and heating history; then, and secondly, nicer and finer control of temperature and heat content in the thermoplastic material during its passage through the extruder to its point of extrusion therefrom to the meritorious end of achieving optimized manipulation and handling of the involved thermoplastic in order that best possible extrudate may be delivered and realized. An important coincident of such practice, by the way, is to facilitate utilization of extrusion apparatus having materially reduced and relatively shorter barrel length design(s) and implementations as compared to those wherein the advantage of internal screw heating technique(s) is not embodied.

In order to separate and define the internally-created heat-exchanging zones in screws of the indicated type, one or more plug-seal devices or appliances are fitted within the necessary (for the heat-exchanging accommodation purposes) longitudinal bore within the screw. These serve to separate the internal cavity within the hollow extruder screw into the desired plurality of at least two heat exchange-implementing zones. Needless to mention, such a screw is provided with suitable heat-exchange fluid conduit arrangements or plumbing for the circuitry and circulation of the involved heat-exchanging media.

Great difficulty has been encountered with the heretofore-known plug-seal devices. Conventionally, such devices are fixed—usually against an adjoining support and positioning shoulder, within the central bore of the hollow extruder screw. With their usage, the extruder must generally be dissembled (i.e., the screw removed) with frequent accompanying plug boring from within the screw in order to facilitate new plug installation. It is evident that such procedure(s) is/are costly and time consuming and especially undesirable in any equipment—including that which is experimental—wherein changes are oftentimes either required or desired.

There has heretofore been proposed certain types of extrusion apparatus arrangements of the screw extruder variety for plug-seal regulation of the indicated type purportedly capable of avoiding the mentioned difficulty. One of these is typified in U.S. Pat. No. 3,331,100 (to Gorden E. Gould and assigned to THE DOW CHEMICAL COMPANY of Midland, Mich. 48640). While worthwhile, the subject Gould apparatus has some pragmatic deficiencies thereabout. For example, when utilizing the patented equipment, it is commonly necessary to shut down the extruder to make adjustments in order to change the position of the expansible plug within the screw.

Nonetheless, nothing in prior art appears to realistically concern itself with nor teach or lead to an extremely effective and efficient adjustable plug mechanism for heat transfer zone separation in hollow screws for extrusion machines or implementation in the manner of design and beneficial functionality and operability in the way so crucially indigenous as in the present contribution to the art.

FIELD AND PURVIEW OF THE INVENTION

The present invention, and the principle aims and objectives attainable in its practice, pertain(s) and direct(s) to a novel and, in the overall, unprecedented adjustable plug mechanism of the indicated variety, in cooperative combination of the essential parts, elements and components therefor and thereof in hollow, plural-zoned heat transfer screws for extrusion machines that effectuates:

(i) maximized ease and simplicity of plug movement within the installed screw without removal thereof from or re-working of the apparatus to alter the heat exchanger zone separation and division as needed or wanted; and (ii) utmost efficiency and effectiveness of the adjustable plug in keeping excellent, clean-cut and precise heat transfer zone separation within the screw during operation of the apparatus.

The achievement and provision of all indicated, with even more and additionally other benefits and advantages derivable in and from present practice appear and become more evident in the ensuing description and specification.

SUMMARY OF THE INVENTION

The present invention (in its genesis and as derives from the discovery on which it is based) pertains to an unprecedented and highly advantageous adjustable plug seal mechanism that is arranged to enable very efficacious heat transfer zone provision and exceptional ease and flexibility as to re-establishment(s) and specific changing(s) thereof in and for the hollow, heat-transfer-zone-incorporating screws that equip extrusion machine apparatus in order to realize ameliorated extrusion processing of thermoplastic resinous materials which contemplates and involves, for the stated purposes and desiderations, a cooperative assembly combination in a screw extruder apparatus that is comprised of: a barrel having a first end and a second end; means to provide a feed supply of thermoplastic resinous material to be processed to the first end of said barrel; means (usually die-shaping means) for discharging heat plastified thermoplastic resinous material from the second end of said barrel; a screw disposed within said barrel and adapted to forward heat-plastified thermoplastic resinous material from the first end of said barrel to its second end said screw containing and defining a longitudinally extending internal cavity having a generally cylindrical configuration; a plug within the internal cavity adapted to divide said cavity in confined, separated fashion into at least one (ordinarily a first) heat-exchanging zone; and (optionally) at least one additional subsequent, second or more heat-exchanging zone(s); with said first heat-exchanging zone being frequently disposed towards said first end of said barrel; and said second heat-exchanging zone (when, as is usual, it is utilized) being disposed towards said second end of the barrel; heat-exchanging fluid inlet and outlet conduits in operative connection with each of the heat-exchanging zones within said screw; means for supplying and shutting off the supply of and venting a desired heat-exchanging fluid under pressure and at a selected wanted temperature into and out of each of said heat-exchanging zones; plus with all of that the combined cooperative improvement which comprises: an expansible plug seal mechanism or device adapted to be fitted and moved within said cavity of said screw, said plug seal having therein included at least one incompletely-enclosed and at least relatively cup-like member that is of a form and configuration with a centrally-contained interior void space therein which is so constructed and arranged as to be characterizable in being: flarable laterally outwardly and thus activated and set for sealing function when subject to and spreadingly urged by a heat-exchange fluid under pressure when the same is present centrally within said cup-like member whereby the outer circumferential exterior surface(s) adjacent the rim of said cup-like member are pressed tightly against and in conforming sealing engagement with the internal wall surfaces of said cavity within the screw thus preventing substantial passage of heat-exchange fluid under pressure past or about the so-engaged and activated plug seal.

Advantageously, there are at least a pair of oppositely directed, base-to-base situate cup-like members arranged and included in the plug seal device, each of which opens into and is sealingly affected by fluid in adjacent, sequential heat transfer zones within the cavity of the extruder screw. Also advantageously, the plug seal device is provided with a means for supporting and positioning same within the hollow screw which is a movable adjuster rod extending through the cavity in the screw from the rearward end of same into which the central bore for the cavity entry is made. This rod is also beneficially provided with internal fluid conducting conduit means for servicing one of the heat transfer zones in the screw with appropriate heat-exchanging fluid, which zone is desirably the high temperature control zone about the screw towards or at its forward metering end near or adjacent to the extrusion outlet in the last end of the extruder barrel.

Still other features and implementations of beneficial import and salience are advantageously combinable in and made integral part(s) of the basic, above-delineated adjustable plug seal mechanism assembly of the invention.

Thus, various suitable parts, elements, sub-assemblies and overall assemblies plus other equippage for utilization, as well as working details, embodimental instructions and parameters and other specifics of the invention are also set forth in the following Specification.

ILLUSTRATED EXEMPLIFICATION OF THE INVENTION

The invention is pictorially demonstrated and thoroughly set forth in and by the twenty (20) views of the accompanying Drawing (many of which, for simplicity and convenience, are illustrated in a more-or-less schematic and/or fanciful manner representation and utilize insofar as possible the same reference numerals or letter designations for like and/or similar parts, elements and/or features) wherein, as they are to be taken in conjunction with the Specification that follows:

FIG. 1, broken apart into three (3) major segments, is a side elevation view, partly in section, of a typical screw arrangement for a plastics extruder;

FIG. 2, broken apart into two (2) segments, and partly in section, is a side elevation view of a mounted hollow screw in an extrusion apparatus wherein the barrel is not illustrated but showing an adjustable extruder plug in accordance with the invention in place within the central bore of the screw;

FIG. 3, broken apart into two (2) segments, and schematically shown partly in section, is a side elevation view of an adjuster rod unit for mounting and manipulation of the desired setting placement(s) of the adjustable plug seal device;

FIG. 4 is an end elevation view taken from the forward end of the adjuster rod of FIG. 3;

FIG. 5 is a side elevation view, in section, of one embodiment of an outwardly of laterally flarable cup-like sealing element or member adapted to be employed as (or to constitute) the novel and exceptionally efficient adjustable plug seal device(s) pursuant to the invention;

FIG. 6 is a plan view of the element shown in FIG. 5 taken from (so as to be looking into) the opening side thereof;

FIG. 7 is a side elevation view in section of a suitable spacer part for use in connection with the mounting and positioning of the sort of sealing member shown in FIG. 5 to facilitate mounting thereof on the forward end of the adjuster rod unit of FIGS. 4 and 5;

FIG. 8 is a plan view of the FIG. 7 spacer;

FIG. 9 is a side elevation view in section of a suitable follower part for use in connection with the mounting and positioning of the sort of sealing member shown in FIG. 5 to facilitate mounting thereof on the forward end of the adjuster rod unit of FIGS. 4 and 5;

FIG. 10 is a plan view of the FIG. 9 follower;

FIG. 11 is a fanciful side elevation view, partly in section, showing the cup-like sealing element of FIG. 5 in an adjustable plug pursuant to the invention when the same is in an essentially non-engaging and movable situation within the central bore of the extruder screw;

FIG. 12 is a view making the same sort of depiction as is shown in FIG. 11 but with the cup-like seal element in a pressurized, fluid-forced position wherein its lateral, skirt-like circumferential side is tightly and sealingly engaged against the wall of the central bore of the extruder screw;

Figure 13:
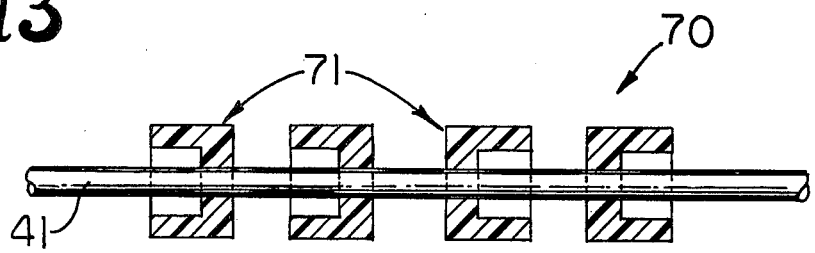
Figure 14:
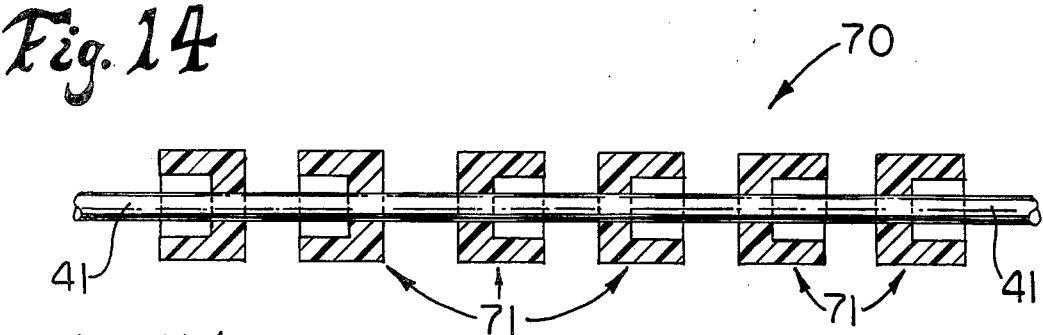
Figure 15:
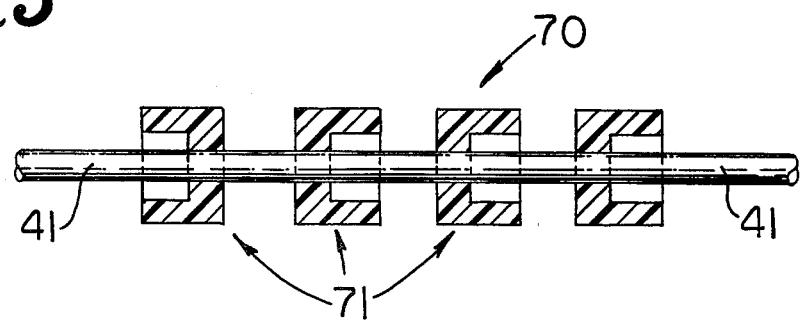
Figure 16:
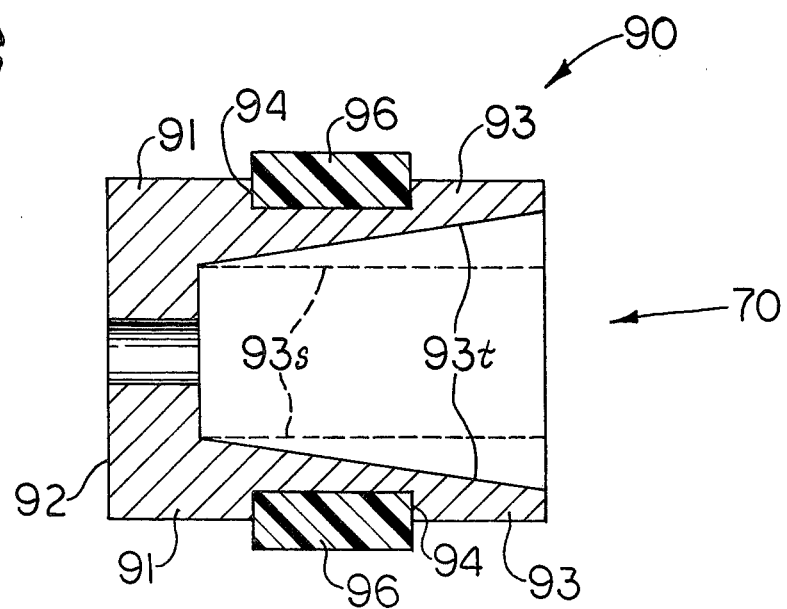
Figure 17:
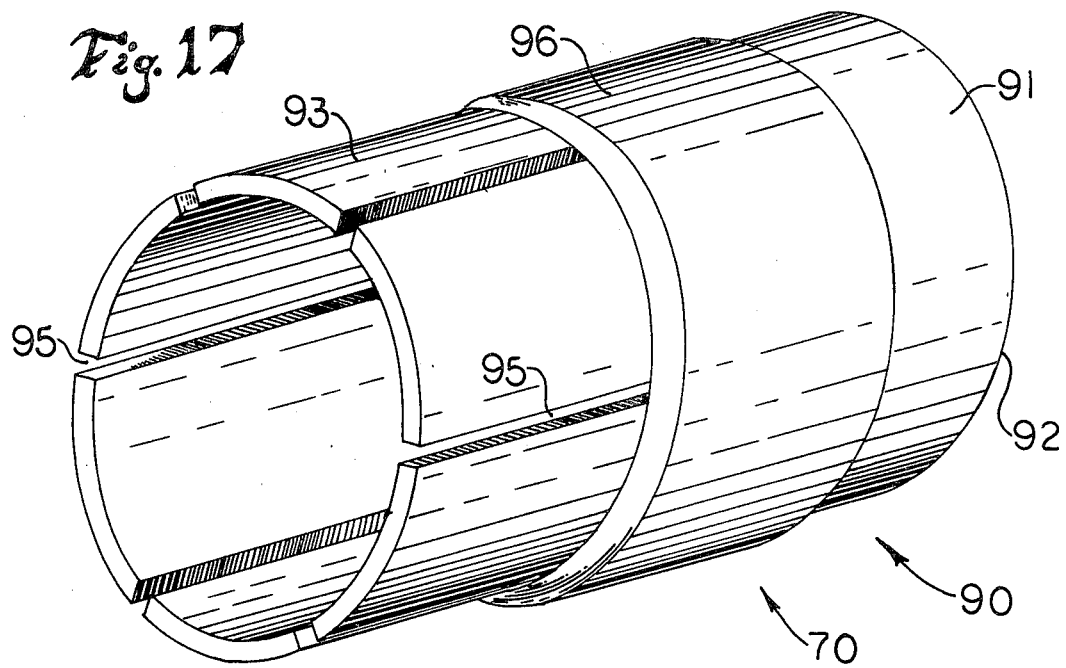
Figure 18:
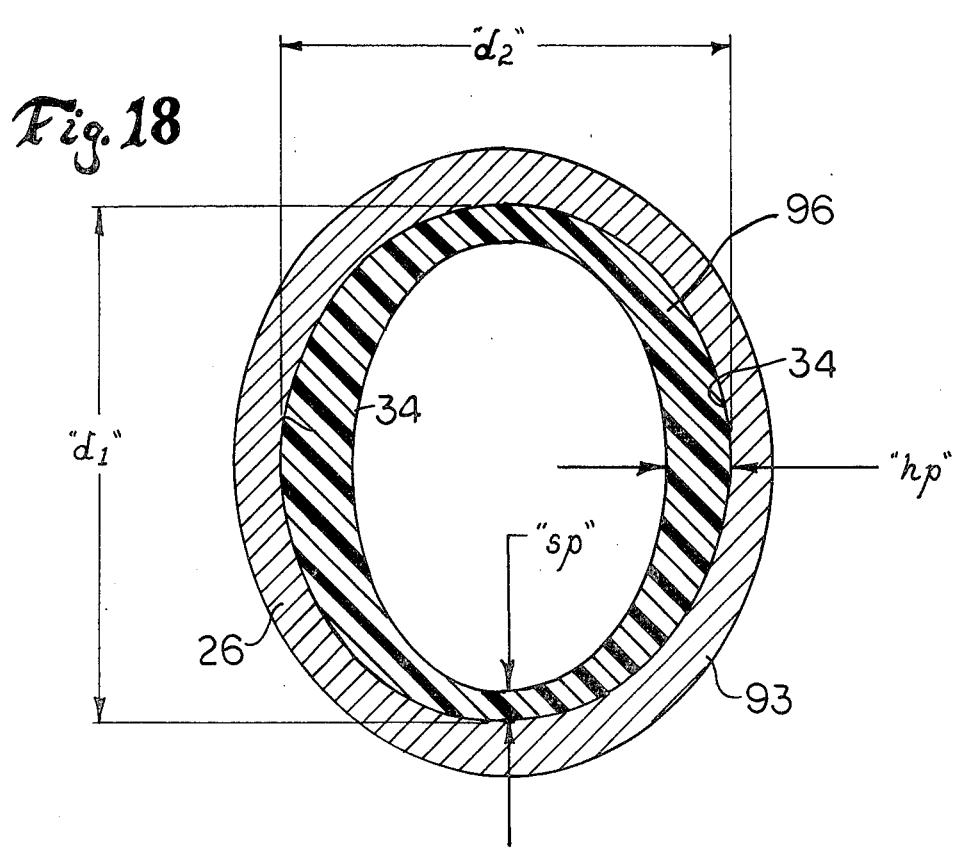

FIGS. 13-15, inclusive, are schematic representational views of various adjustable plug seal devices in accordance with the invention having therein diverse numbers of even and unevenly matched cup-like sealing elements to make up each of the particularly involved plug seal devices that are shown;

FIG. 16 is a schematic side elevation view in section of another embodiment of a laterally flarable cup-like sealing element that comprises a piston-like, usually metal and outwardly springable cup seal base which is provided with a ring-like washer thereabout for engagement with and seating or sealing against the cylindrical wall of the central bore in the hollow extruder screw;

FIG. 17 is a grossly exaggerated (particularly in the length-wise portrayal aspect thereof) perspective view of a splined variation of the style of cup-like sealing element brought forth in FIG. 16;

FIG. 18 is a fanciful cross-sectional view, also exaggerated, of the cylindrical wall about the central bore of a hollow extruder screw with its not-truly-circular ovality characteristics brought out in pronounced fashion and showing the varying compression effects and physical sealing action conformation pattern thereagainst of the washer part on the sort(s) of sealing elements portrayed in FIGS. 16 and 17; and FIGS. 19 and 20, respectively, are schematic side elevation viewings which illustrate different positionings within the central bore of an extruder screw of an adjustable plug seal device in accordance with the invention in order to alter the longitudinal interval spacings and dispositions of the consecutively separate heat-exchange and -controlling zones of and within the screw.

Figure 2:
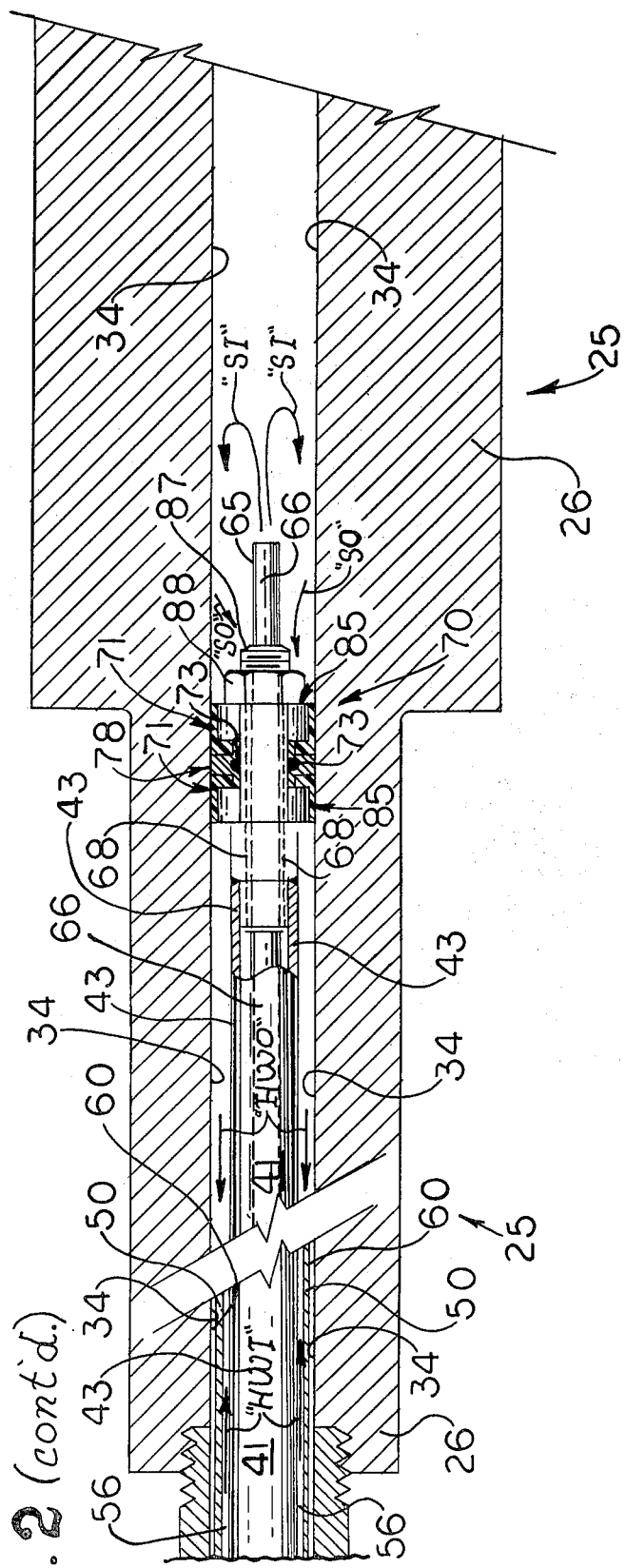
Figure 3:
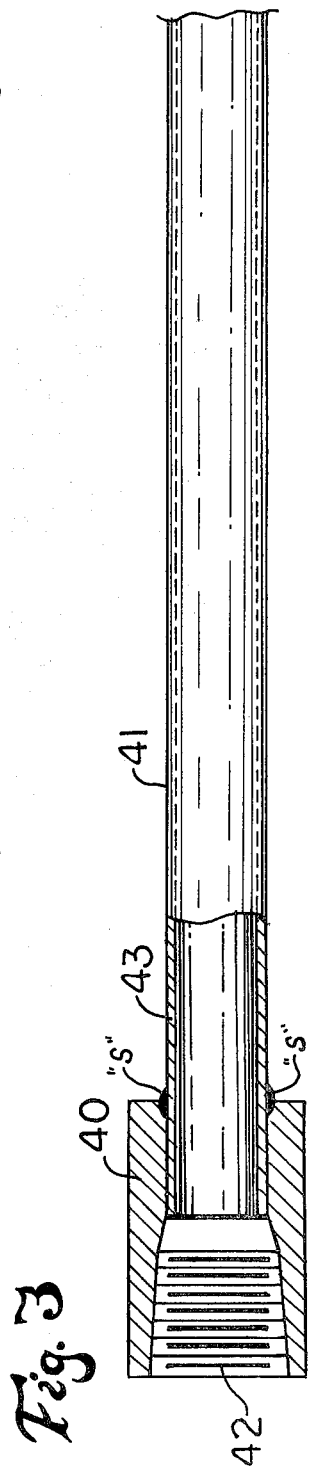

For expedience and enhanced clarity of associated parts, elements, components, subassemblies and assemblies, simultaneous reference is now had to all the included FIGURES in the Drawing with explanation thereof in the following catalogued description of parts, etc., as identified by the reference numeral and given letter designations (i.e., "Ref. No(s).") therewith associated (and not taken up in strictly sequential numerical order):

| Ref. No(s). | Description With Relevant Corollary Explanation |
|---|---|
| 25 | General designation of a typical and frequently employed extruder screw (predominantly detailed in FIG. 1). |
| 26 | The cylindrical wall of the hollow screw 25 (see FIG. 2). |
| 27 | The normally constant diameter root of the screw 25. |
| 29 | General designation for the hub section of the screw 25. |
| 30 | General designation for the (usually stepped) support shaft from the hub portion 29 of the screw 25. |
| 32 | The typical and normal screw flights for material forward and handling in its passage through the extruder as the same are disposed in the screw and about the root 27. |
| "fd" | The screw flight 32 diameter. |
| "ft" | The screw flight 32 thickness. |
| "fsf" | The mean spacing of screw flights 32 in the feed zone of the extruder to take up the supply for processing from a feed means, such as a conventional hopper inlet (not shown). |

| Ref. No(s). | Description With Relevant Corollary Explanation |
|---|---|
| "fsc" | The mean screw flights 32 spacing in compression zone of the extruder to pass it to or towards the metering and extrusion outlet (not shown), as through a suitable shaping die means at the discharge end of the extruder. |
| 33 | As is illustrated only in FIG. 1, the special screw flights in the so-called "dam" portion of the extruder generally towards its forward, output end away from the hub section 29 of the screw which functions to strain (or restrain), as it were, and hold back from extrusion insufficiently and/or non-uniformly liquefied or molten thermoplastic particles being progressed through the extruder for fabrication and so forth from the non-depicted extruder outlet, all of which requires and must be attended by close temperature control and regulation. |
| "k" | General designation (brought out only in FIG. 1) of the relative clearance spacing or differential between the circumferential edges or lands of the normal screw flights 32 and the dam screw flights 33 which accomplishes the indicated and well-known homogenizing action for the uniform melt obtention. |
| 34 | The longitudinally extending, central bore hole in the hollow screw 25 encased by screw wall 26 (see FIG. 2). |
| 35 & 37 | General designations for more or less standard or rotary joints for support of the screw 25 and passage into and withdrawal from the central bore 34 and conduit arrangements therewithin of heat-exchanging fluid media for temperature control effects for and in the screw. |
| 36 | A threaded nipple for connecting rotary joint 35 with rotary joint 37. |
| 41 | The adjuster rod on which the plug seal device arrangement 70 is mounted for slidable movement and positioning within the central bore 34 of the extruder screw 25, which rod 41 is one good means for supporting and easily moving the seal arrangement 70 when heat-exchange fluid pressure is removed or cut off as well as, advantageously, to hold and provide conduit means for heat-exchange fluid supply and withdrawal for part (usually to the forward end) of the screw. |
| 40 | The end holder for adjuster rod 41. |
| "s" | Solder points. |
| 42 | A threaded open end in holder 40 for adjuster rod 41. |
| 43 | The outer wall of adjuster rod 41. |
| 45 | Nut and bolt fasteners on rotary joint 35. |
| 46 | Packing in rotary joint 35. |
| 50 | A central water carrying tube wall about outer wall 43 of adjuster rod 41. |
| 52 | A spring loaded seal arrangement in rotary joint 37. |
| 53 | Mechanical spring in rotary joint 37. |
| "HWI" & "HWO" | Directional arrows to respectively designate the "hot water in" point through rotary joint 35 and "hot water out" passage to and from the joint. |
| 55 | The hot water inlet port. |
| 56 | An annular space between tube wall 50 and adjuster rod 41 for carrying hot water within the hollow screw 25. |
| 58 | The hot water outlet port in rotary joint 37. |
| 60 | An annular space between tube wall 50 and interior bore 34 in screw 25 for hot water outlet. |
| 65 | A central steam inlet tube in adjuster rod 41. |
| 66 | The steam inlet passageway in tube 65. |
| "SI" | Directional arrows to designate the "steam in" path of circulation through adjuster rod 41. |
| "SO" | Directional arrows to designate the "steam out" path of circulation through adjuster rod 41. |

-continued

| Ref. No(s). | Description With Relevant Corollary Explanation |
|---|---|
| 68 | The annular space between outer wall 43 of adjuster rod 41 and the central steam inlet tube in the adjuster rod for steam outlet provision. |
| "op" | An annular opening between the cup-like seal element and the screw bore when the cup seal is relaxed (i.e., with no flaring pressure on it). |
| "P (neg.)" | Directional arrows (FIG. 11) indication loose seal disposition of seal members when no heat-exchange fluid pressure is applied. |
| "P (pos.)" | Directional arrows (FIG. 12) indicating outwardly flared, seated and tightly sealed disposition of seal members when heat-exchange fluid pressure is applied. |
| 70 | General designation of adjustable plug seal device arrangement pursuant to the invention. |
| 71 | General designation of an expandable plug seal cup-like element having a circumferential skirt-like side wall extending from its relatively solid and usually flat base. |
| 72 | The opening in cup-like element 71 to accommodate a spacer 78 about the adjuster rod 41. |
| 73 | Wall of cup-like element 71. |
| 78 | General designation of the spacer part. |
| 79 | A groove for "O"-ring accommodation in the spacer 78. |
| 80 | The spacer flange. |
| 81 | The spacer shoulder. |
| 83 | An "O"-ring gasket. |
| "wt" | Angle of wall taper in cup-like element 71 (FIG. 5). |
| "ba" | The bevel angle on the interior wall 73 of the cup-like element 71 (FIG. 5). |
| 85 | General designation of the follower part in the plug seal assembly 70. |
| 86 | A bore in the follower 85 to allow its being fit around the adjuster rod 41. |
| 87 | The threaded forward end of adjuster rod 41 to facilitate mounting of plug seal assembly thereon. |
| 88 | A nut to hold plug seal assembly 70 in place on the end of adjuster rod 41. |
| "m" | A bidirectional movement arrow (FIGS. 19 and 20) to show the position setting movement of adjuster rod 41. |
| "H" | An exterior longitudinal stop or holder location (details not shown) for maintaining adjuster rod 41 in longitudinal position after any desired setting thereof is made. |
| "POS.I" | General designation for the plug-seal "out" position (FIG. 19) when the seal is towards the back end nearer the feed to extruder screw 25. |
| "POS.II" | General designation for the plug-seal "in" position (FIG. 20) when the plug seal device is pushed to be positioned toward the forward extruding or metering outlet end of the screw 25. |
| 90 | General designation of a form of metal cup-like base element for a plug seal device 70 (FIGS. 16 and 17). |
| 91 | The support wall in the metal cup-like seal base 90. |
| 95 | Axially extending slits in the wall 91 of the metal cup-like seal base 90. |
| 92 | The base part of the metal cup-like element 90. |
| 93 | The outwardly-urgeable, flarable wall or flange skirt of the piston-like metal cup-like element 90. |
| 94 | A circumferential groove or recess in the flarable wall 93 for receiving and retaining the sealing washer or ring 96 in the assembly of element 90. |
| 96 | The "TEFLON" (Reg. TM) or equivalent sealing ring washer in groove 94 of element 90. |
| 93t | Tapered inner wall surface in the flarable skirt portion wall 93 of one form of embodiment of element 90 (FIG. 16 only). |
| 93s | Again only in FIG. 16, coaxially drawn phantom lines to emphasize the tapering construction of inner wall surface 93t. |
| "d$_1$" | To illustrate the relative ovality (or degree of out-of-round condition) of a typical longitudinal center bore in a hollow extruder screw, the greater average inner diameter dimension of the bore hole 34 (FIG. 18). |
| "d$_2$" | The lesser average inner diameter dimension of bore hole 34 (FIG. 18). |
| "hp" | The high (or higher) pressure point at and against the smaller diameter "d$_2$" region of the bore hole 34 when cup-like element 70 is flared outwardly under fluid pressure to be urged against the lesser-distanced opposing inner wall surfaces of the bore so as to thereby more or less "squeeze out" and more definitely compress the adjoining section of washer or ring 96 to accommodate the peculiar ovality configuration of the bore hole at that (or those) point(s) while keeping good sealing contact in the bore all about the ring for effective zone definition and separation; as shown in FIG. 18. |
| "sp" | The low (or lesser) pressure point at and against the larger diameter "d$_2$" region of the bore hole 34 when cup-like element 70 is laterally outwardly activated or expanded by interior fluid pressure to be urged against the larger-distanced opposing inner wall surfaces of the bore so as to thereby more or less allow greater relaxation and less compression of the adjoining section of washer or ring 96 to accommodate the peculiar ovality configuration of the bore hole at that (or those) point(s) while keeping good sealing contact in the bore all about the ring for effective zone definition and separation, as is also brought out in FIG. 18. |
| "LoTZ" | The low temperature zone of influence in and of screw 25 (at least insofar as concerns the heat condition of the thermoplastic material being handled by and about the screw), subject to adjustment and length or capacity variation by movement of the adjustable plug seal device in practice of the present invention (demonstrated in FIGS. 19 and 20). |
| "HiTZ" | By analogy to and the obverse of the "LoTZ" and also brought out in FIGS. 19 and 20, the high temperature zone of influence in and of hollow extruder screw 25. |

With an overview of the several depictions, views and illustrations of the Drawing being maintained (especially in light of the foregoing explanation of parts, etc., and other elucidations), the subsequent portion of this Specification now turns to a somewhat more cohesive and particularized disclosure and exposure of and coordinated amplification upon the invention; including therein most appropriate and expedient (or best) manners and means stemming from the foregoing in which the same may be advantageously and propitiously embodied and practiced.

In this connection, the basic principles and limitations of: extrusion apparatus for thermoplastic materials; extruder screws for such apparatus; heat transfer zone separation in such extruder screws; thermoplastic materials handling and treatment for fabrication and other processing (including that with very heat-sensitive products); heat-exchange fluid application and usage for heating and/or cooling purposes; machine and machine parts design and manufacture; suitable materials of construction for given utilization requirements; and so forth, are so widely comprehended by those skilled in the art that greatly detailed elaboration of all the basics thereof is not herein made or attempted; the same being unnecessary for thorough understanding and recognition of the advance possibilitated for achievement and realization by and with the development in and of an outstanding and simplified adjustable plug seal mechanism for heat transfer zone separation in hollow screws for extrusion machines and the like improvement that is according to and in keeping with the present invention.

PARTICULARIZED OPERATION AND USE DESCRIPTION OF THE INVENTION

As is clearly evident from the foregoing disclosure and description, the present invention is the provision for use of an innovative adjustable plug seal mechanism for the indicated application which is comprised of at least one supple, resilient, outwardly deformable and flarable cup-like member which is urgeable into a laterally expanded condition simply by fluid pressure in the cup opening (and without other mechanical locking or expanding assistance) to form a cylinder wall-conforming and -gripping, plug-binding device capable of a fluid-tight sealing function. The plug seal device thus readily achieves heat transfer zone separation in hollow screws for extrusion machines by mere application thereagainst of the involved heat-exchanging fluid medium or media; being released from sealing engagement and in condition for easy movement within the screw cavity to re-establish or change the desired confines of the heat transfer zone(s) needed or wanted in the extruder screw.

Some of the characteristics and particulars of the instant contribution to the art that are, perhaps, not completely abundantly plain in and from the foregoing Specification are now more precisely expostulated, including optimum parameters prescribable for practice of the invention.

The basic and outstanding advantage and hitherto unknown benefit of the present invention is the exceptional adaptability and latitude it allows of and for ready and easy plug seal positioning and setting changes within hollow extruder screws as to where the desired heat effects are wanted to be applied. This, by virtue of the instant development, allows such regulation to be done literally instantaneously or, as it were, "on the fly" without encountering for such purpose any long apparatus shut down or requiring use of special tools or tedious adjustments in order to mechanically contract or expand the plug seal device to facilitate its longitudinal movement within the central bore cavity of the hollow extruder screw.

Accordingly, as is demonstrated by the comparative showings of FIGS. 19 and 20 of the Drawing, changes in respective relative dimension and capacity in the "LoTZ" and the "HiTZ" are done most straightforwardly to move the essentially double acting plug seal mechanism 70 from "POS.I" to "POS.II", for example (or vice versa) by: firstly, simply momentarily turning off the heat-exchanging fluid to release the seal seating of the cup-like member(s) 71 from engagement against the inner wall surface of the bore hole 34 which leaves the plug seal in a literally "free-floating", with much attendant wall clearance, disposition; then moving the loosened plug seal 70 to the desired new location by pushing (or pulling) of adjuster rod 41 in the suitable direction "m" through handle means "H"; and finally, turning back on the flow of heat-exchange fluid which automatically locks plug seal 70 in sealing disposition in its desired new location while simultaneously resuming preferred heat-regulating operation of the extrusion apparatus.

The importance of close and precise heat regulation in the extrusion processing of most thermoplastic resinous materials cannot be overstressed. This is particularly the case when heat-sensitive synthetic resinous thermoplastics are involved, such as the various polymers which include various copolymers of vinylidene chloride. Careful control of such materials must be exerted throughout the extrusion processing to avoid thermal degradation (which can be of such severity as to cause carbonization). Careful control of resinous thermoplastics is also needed when devolatilization handling is done in the extrusion apparatus, as well as for purposes of ensuring proper and efficient melting of the plastic during it passage through the extrusion apparatus.

As particularly concerns the melting of the plastic material during its handling in and by the extrusion apparatus, it must be borne in mind that a great deal of the heat energy required for this derives and is generated by and from the mechanical working and masticating action of the screw in forcing the initially particulated plastic through the barrel of the extruder. In many cases, in fact (and as is well known), the mechanical-working-heating effect in certain close tolerance extruders is so great that, for best results especially when thermo-sensitive materials are involved, cooling rather than heating zones are dictated and employed along the length of the extruder to optimumly accommodate the thermoplastic processing.

Thus, when refrigerant effects are utilized to best regulate temperature, it is often typical to employ coolant water (or a chilled glycol solution or the like or equivalent) alone as the heat-exchanging fluid in the rearward segment of the hollow screw with the forward portion of the screw being left neutral and ambient, in effect, with respect to its lack of heat-exchanging capacity. In such instances, as can readily be appreciated, the plug seal mechanism according to the invention can consist of only a single cup-like element appropriately mounted (in generally single acting fashion) and oriented to maintain only a single heat-transfer zone in the screw. Obversely and in other situations, the same but reverse embodimentation may apply when it is only needed or desired to heat (or cool) the forward or nose portion of the hollow screw with, say, steam (or water or oil or the like) while leaving the rearward part of same in the shank section thereof neutral without any purposive temperature control zone therein effected.

As further concerns the plastic material melting in the extruder, it is well and widely appreciated that very precise and delicate temperature control is needed when the screw is equipped with a spiral "dam" provision near its forward end to hold up the unmelted material and place additional shear thereon to facilitate its liquefaction while allowing the melt to pass forward on over the dam for ultimate extrusion from the apparatus. The "dam" phenomenon follows the general pattern of working by internal screw conveyance and melting particulate thermoplastic material through an extruder whereby the solids are generally moved forward while the melt tends to propagate rearwardly on each screw flight due to the hydraulic effects encountered. The fine heat regulation in the region of the spiral "dam" helps complete the melt without deleterious influence on any of either the solid or molten materials present.

Now then, the interior diameter (i.e., "I.D.") of many commonly-employed extruder barrels is from 2.5 to 4.5 inches (i.e., about 6.35 to 11.43 centimeters). Of course, some other extruders having barrel I.D.'s up to 8 and 10 inches (20.32 to 25.40 centimeters) and more are not uncommon; although many extruders—including those for experimental usage—have barrel I.D.'s as small as 1 inch (2.54 centimeters) and less. A common clearance dimension "k" on the spiral "dam" portions of such extruders is 10 mils (i.e., 0.010 inch or 0.0254 centimeter), through which space with very careful temperature control the final particle melting must be achieved. The criticality of excellent temperature regulation in extruders of the indicated barrel sizes with heated spiral "dam" screws therein is highlighted by the relative physical proportions and dimensions involved.

Furthermore, slight changes in composition of the given thermoplastic material being handled as well as changes in precise processing conditions often require adept adjustment in the temperature control zones provided in connection with the heated screws utilized in the apparatus.

In any event, the foregoing definitely emphasizes the bulk of the involved problems and the great desirability and practical need of having quick and facile, albeit entirely sure and reliable, means for changing the temperature control zones in the internally heated temperature-regulating screws frequently used in extrusion machines. In this, plug seal movement for temperature control zone change is often at least on the order of 2 to 3 times the diameter of the cavity in the hollow extruder screw; and sometimes much more. And, practice of the present invention, as is apparent, nicely and very pragmatically fulfills this.

As has been noted, the extrusion apparatus with which the presently contemplated adjustable plug seal mechanisms are provided, utilize conventional and/or suitable feed and extrusion means, as well as conventional and/or suitable fluid providing means and techniques for the hollow screw; although particular implementations of same are not illustrated or particularly shown in the Drawing.

The substantially unitary cup-like elements 71 (particularly of the style depicted in FIGS. 5 and 6 of the Drawing) advantageously and as has been mentioned, are formed of "TEFLON" (Reg. TM) or the like or equivalent polytetrafluoroethylene or other fluorinated hydrocarbon material of construction (such as "KEL-F" (Reg. TM)). "TEFLON" is supple, flexible, resilient, and, in the cup-like form utilized, readily conforming to and easily assuming the profile of the wall surface against which it is urged and pressed into sealing engagement. It is well adapted to withstand heat at elevated temperatures. At the same time, it has good deformability and cold flow characteristics at literally all expectable temperature conditions which may be experienced in practice of the present invention.

The suppleness, flexibility, resilience and conformability characteristics of the bore wall-engaging material in the cup-like element 71 is of extreme importance. The cavity bore holes 34 in hollow screws 25 are seldom (if ever) truly round or perfectly linear; tending actually to be non-cylindrical relatively cork-screwing holes with noticeably oval or elliptical cross sections. These bore holes, which commonly and without limitation range in nominal diameter (depending, of course, on the correlated screw size) from 0.75 to 1.5 inches (i.e., 1.90 to 3.81 centimeters) or so, can and often do exhibit ovalities or out-of-round features as great as about 1/64 inch (i.e., 0.04 centimeter) per each inch (2.54 centimeters) of nominal diameter; this being a rather pronounced cross-sectional non-circularity. At the same time, the interior wall surfaces of the typical cavity bore in a hollow extruder screw is invariably on the noticeably rough side; with root-mean-square (i.e., "RMS") surface roughnesses on the order of 0.0015 inch (i.e., 0.0038 centimeter) or so being not at all uncommon. Hence, the significance of the indicated conformability capability of the material of construction for the cup-like element 71 or, alternatively, of the wall-engaging washer or ring band 96 on and around a usually metal cup-like base in an element 90 of the style shown in FIGS. 16 and 17.

However, other materials besides "TEFLON" and the like fluorocarbon products may also be utilized, depending to some greater-or-lesser degree on the temperature conditions to be encountered and the life expectancy wanted at operating temperature (which usually tends to decrease in higher temperature surroundings). Thus, "VITON" (Reg. TM), a rubber product, may be utilized for the indicated purpose as may neoprene and rubber(s) and in many cases, leather and impregnated leather goods. For relatively cold operations, such materials as the so-called "GOULD LEATHER" (including impregnated variations thereof) and "CORFAM" (Reg. TM), a synthetic leather, may be satisfactorily utilized.

Regardless, the resilient and deformable, surface-conforming materials of construction in the cup-like elements of the plug seal mechanisms must, as indicated, be capable with extrusion temperatures and resistant to attack and able to withstand loss of properties upon contact with the heat-exchanging fluids with which they are to be contacted under the anticipated temperature conditions of use.

Good commercially-available cup-like elements 71 of the type particularly depicted in FIGS. 5 and 6 of the Drawing are standard "TEFLON" piston cup packings (widely used for piston pump applications) which may be obtained from THE CRANE COMPANY of Chicago and which are ordinarily well utilizable with only relatively minor physical modifications (usually machining to better shape the circumferential skirt or cup wall contours) thereof. In these, the angle of upward and outward flare or taper of the skirt wall 73 from at least relatively flat base or bottom of the structure should be between about 5° and 20°, preferably from 10° to 15°; and the bevel angle "ba" in the inner rim on the outlet opening of the interior cup wall should be at least about 30° and with greater advantage at least about 45°, preferably in the neighborhood of 60°. The bevel angle "ba", as is apparent, thins out the terminating skirt portion of circumferential cup wall 73 in the region where cavity bore surface engaging contact for sealing will be made and thus materially adds to the suppleness and conformability of the cup-like element. Along this line and for very effective sealing, it is desirable for the actual width or band of engaged sealing contact made by the cup-like element, regardless of exact embodimental form thereof that is utilized, to be between about 1/20th and 1/5th, advantageously from about ⅛th to 1/12th, of the nominal diameter of the cavity bore in the hollow seal in which the plug seal mechanism is incorporated.

The major thickness of the wall 73 in a cup-like element 71 (of the FIGS. 5 and 6 type) or of the washer 96 in a cup-like element 90 (of the FIGS. 16 and 17 style) depends to a large extent on its involved material of construction and, to a larger extent, on its nominal exterior diameter. This may vary from thickness/diameter percentage ratio in smaller constructions of from 10–15% or so and from 2–5% or so in larger constructions. Thus, a typical thickness in "TEFLON" constructions of 1 inch (2.54 centimeters) nominal diameter is about 0.125 inch (i.e., 0.317 centimeter) with the same applying up to about a 3-inch (7.62-centimeter) nominal diameter. For "TEFLON" construction nominal diameters in the range of 3 to 6 inches (7.62 to 15.24 centimeters), a typical thickness is 0.156 inch (0.396 centimeter). At 12-inch (30.48-centimeter) nominal diameters of "TEFLON" construction, 0.250 inch thickness (0.610 centimeter) is typical.

Cup-like elements 71 of the style demonstrated in FIGS. 5 and 6 of the Drawing tend to function better and with more uniform and conforming circumferential engagement in bore holes of greater ovalness than do those of the metal based-supported type illustrated in FIGS. 16 and 17. This is probably due to the greater "squeezing" effect on the washer 96 in bore holes having maximized out-of-round characteristics, making it more difficult to achieve uniform, all-around conformation by the washer. Nonetheless, as FIG. 18 demonstrates, a satisfactorily resilient and deformable washer 96 is adaptable to good bore hole conformation and engagement in a FIGS. 16 and 17 type cup-like element 90.

And, on the other hand, the FIGS. 16 and 17 style of metal base cup-like elements 90 are often quite suitable for employment in plug seal mechanisms 70 that are comprised of only a single element.

The piston-like wall substructure 91 support of a two-piece, metal (or equivalent) base cup-like element 90 of the type shown in FIGS. 16 and 17 of the Drawing is, obviously, a springable, expansible metal such as certain of the bronzes and brasses or many of the stainless and other alloy steels. A splined construction, as illustrated in FIG. 17 of the Drawing, is very beneficial towards ensurement of satisfactory outward flarability and expansibility of a metal base cup-like element 90. Usually 4 to 8 splines, advantageously about 6, are adequate.

As brought out in the preceeding explanation and depicted in the illustrations of FIGS. 11 and 12 of the Drawing, the plug seal mechanism 70 of the present invention may consist of only a single cup-like element 71 or 90 so as to be functionable in a single acting fashion. This, as disclosed, is usually ample when only a single heat transfer zone is incorporated in the hollow screw. More often, however, and as portrayed in FIGS. 2, 19, and 20 of the Drawing, a back-to-back, oppositely oriented pair of cup-like elements 71 or 90 are employed, especially in the more-frequently-encountered situations wherein the hollow screw 25 has a plurality of sequential heat transfer zones therein incorporated.

In this connection, more than a pair of the cup-like elements may be employed in various numbers and orientation arrangements thereof in any given plug seal mechanism 70 in accordance with the present invention. Thus, as shown in FIG. 13 of the Drawing, a double pair of elements arranged in two-against-two, oppositely-paired orientation may be utilized. In this, a multiplicity of commonly-oriented cup-like elements on either side or both sides of the plug seal tends to enhance the sealing potential and resistance to leakage and fluid by-pass of the mechanism and can be of particular helpfulness and utility for handling of systems wherein the heat-exchange fluids(s) is/are under considerable pressure in applications and presence. Thus, and alternatively, as illustrated in FIG. 14, a single pair of elements oriented in one direction may be coupled with four oppositely-oriented elements to constitute the plug seal mechanism. Still other combinations may be made to meet particular sealing requirements in given situations. To demonstrate another example of such possibilities, FIG. 15 shows a single cup-like element in diverse orientation on one side of a plug seal arrangement coupled with three oppositely-oriented cup-like elements on the other side of the same plug seal mechanism.

Although it is possible to intermix different type cup-like elements in any given plug seal mechanism in which there are a plurality thereof, it is usually preferable to utilize the same sort of element throughout any particular, plural element-containing plug seal mechanism made in keeping with the present invention.

The holder means "H" for adjuster rod 41 is not illustrated in the Drawing. Anyone skilled in the art can readily implement suitable means for steadying and locking in place the adjuster rod in any position of insertion within the interval cavity 34 of the hollow screw 25. For example, a simple bar at the end of the rod to facilitate its pushing-in and pulling-out movement may be simply fit into matching, accommodating stop clamps for its securement. Or, an engaging lock clamp of any sort can be utilized with or about the adjuster rod to hold it in place once its position has been set or changed.

Use of the present plug seal devices has provided exceptionally good results in processing resins at 260 lbs (118 kgs) per hour rate through a 2½-inch (6.35-centimeter), 64-inch (1.63-centimeter) long extruder with first hot water and second steam zones in the screw in which numerous 2 to 12-inch (5.08 to 30.5 centimeter) temperature zone change length adjustments were made to accommodate handling of specifically varying plastic compositions being run needing altered heat and temperature control conditions for optimum results; all of which was accomplished with literally no machine shut-down during the processings in order to make the needed zone size changes therein and throughout.

Many changes and modifications can readily be made in and adapted to embodiments and practices in accordance with the present invention without substantial departation from its apparent and intended spirit and scope, all in pursuance and accordance with the same as it is set forth and delineated in the hereto-appended claims.

What is claimed is:

1. A cooperative assembly combination for ameliorated extrusion processing of resinous thermoplastic material comprising in a screw extruder apparatus:
  (i) a barrel;
  (ii) said barrel (i) having a first rearward end (A) and a second forward end (B);
  (iii) means to provide a feed supply of thermoplastic resinous material to be processed to said first end (A) of said barrel (i);
  (iv) means to discharge heat plastified thermoplastic resinous material from said second end (B) of said barrel (i);
  (v) a hollow screw disposed within said barrel (i) and adapted to forward heat-plastified thermoplastic resinous material from said first end (A) to said second end (B) of said barrel (i), said screw containing and defining (vi) a longitudinally-extending internal cavity having a generally cylindrical configuration;

(vii) a plug within the internal cavity (vi) adapted to divide said cavity in confined, separated fashion into (viii) at least one heat-exchanging zone; with said heat-exchanging zone (viii) being disposed between said first end (A) and said second end (B) of said barrel (i) and having heat-exchanging fluid inlet and outlet conduits in operative connection with said heat-exchanging zone (viii) within said screw (E);

(ix) means for supplying and shutting off the supply of and venting a desired heat-exchanging fluid under pressure and at a selected wanted temperature into and out of said first heat-exchanging zone (h); plus the combined cooperative improvement comprised of:

(x) an expansible plug seal mechanism adapted to be fit and moved within said cavity (vi) of said screw (v), said plug seal (x) having therein included at least one incompletely-enclosed and at least relatively cup-like member (xi) that is of a form and configuration which is so constructed and arranged with a centrally-contained interior void space therein as to be characterized in being:

resiliently deformable and flarable laterally outwardly activated when subject to and spreadingly urged by heat-exchange fluid under pressure when same is present centrally within said cup-like member (xi); whereby the outer circumferential exterior surface(s) of each of said cup-like members (xi) are pressed against and in conforming sealing engagement with the internal wall surfaces of said cavity (vi) within the screw (v);

thus preventing substantial passage of heat-exchange fluid under pressure past or about the so-engaged and activated plug seal (x).

2. The assembly combination apparatus of claim 1 wherein there is only a single heat-exchanging zone (viii) therein; and said heat-exchanging zone (viii) is situate in the internal cavity (vi) of said hollow screw (v) in the rearward portion of the screw which is disposed towards said rearward end (A) of said barrel (i); with the forward portion of said screw which is disposed towards said forward end (B) of said barrel (i) being neutral and ambient with respect to its lack of heat-exchanging capability.

3. The assembly combination apparatus of claim 1 wherein there is only a single heat-exchanging zone (viii) therein; and said heat-exchanging zone (viii) is situate in the internal cavity (vi) of said hollow screw (v) in the forward portion of the screw which is disposed towards the forward end (B) of said barrel (i); with the rearward portion of said screw which is disposed towards said forward end (B) of said barrel (i) being neutral and ambient with respect to its lack of heat-exchanging capability.

4. An assembly combination apparatus in accordance with that of either claim 2 or claim 3, wherein each of said cup-like members (xi) is so oriented in said plug seal mechanism (x) so as to open in a direction that is facing and against the heat-exchanging zone (viii) within said internal cavity (vi) of the hollow screw (v).

5. A cooperative assembly combination which is in general accordance with that of claim 1 for ameliorated extrusion processing of resinous thermoplastic material comprising in a screw extender apparatus:

(a) a barrel;

(b) said barrel (a) having a first rearward end (b1) and a second forward end (b2);

(c) means to provide a feed supply of thermoplastic resinous material to be processed to said first end (b1) of said barrel (a);

(d) means to discharge heat plastified thermoplastic resinous material from said second end (b2) of said barrel (a);

(e) a hollow screw disposed within said barrel (a) and adapted to forward heat-plastified thermoplastic resinous material from said first end (b1) to said second end (b2) of said barrel (a), said screw containing and defining (f) a longitudinally-extending internal cavity having a generally cylindrical configuration;

(g) a plug within the internal cavity (f) adapted to divide said cavity in confined, separated fashion into at least (h) a first heat-exchanging zone; and (i) a subsequent, minimally second heat-exchanging zone; with said first heat-exchanging zone (h) being disposed towards said first end (b1) of said barrel (a); and said second heat-exchanging zone (i) being disposed towards said second end (b2) of said barrel (a);

(j) heat-exchanging fluid inlet and outlet conduits in operative connection with said first heat-exchanging zone (h) within said screw (e);

(k) means for supplying and shutting off the supply of and venting a desired heat-exchanging fluid under pressure and at a selected wanted temperature into and out of said first heat-exchanging zone (h);

(l) heat-exchanging fluid inlet and outlet conduits in operative connection with said second heat-exchanging zone (i) within said screw (e);

(m) means for supplying and shutting off the supply of and venting a desired heat-exchanging fluid under pressure and at a selected wanted temperature into and out of second heat-exchanging zone (i); plus the combined cooperative improvement comprised of:

(n) an expansible plug seal mechanism adapted to be fit and moved with said cavity (f) of said screw (e), said plug seal (n) having therein included at least one incompletely-enclosed and at least relatively cup-like member (o) that is of a form and configuration which is so constructed and arranged with a centrally-contained interior void space therein as to be characterizable in being: resiliently deformable and flarable laterally outwardly activated when subject to and spreadingly urged by heat-exchange fluid under pressure when same is present centrally within said cup-like member (o); whereby the outer circumferential exterior surface(s) of each of said cup-like members (o) are pressed tightly against and in conforming sealing engagement with the internal wall surfaces of said cavity (f) within the screw (e); thus preventing substantial passage of heat-exchange fluid under pressure past or about the so-engaged and activated plug seal (n).

6. The assembly combination apparatus of claim 5, wherein said plug seal mechanism (n) contains at least a pair of oppositely-oriented cup-like members (o); with each of the diversely oriented cup-like members (o) being respectively open in opposite directions that are individually correspondingly in separate directions that are facing and against the said respective heat-exchanging zones (h) and (i) within said internal cavity (f) of said hollow screw (e).

7. An assembly combination apparatus in accordance with that of either claim 1 or claim 5 and including, in addition thereto and in further combination therewith a (p) slidable adjuster rod means extending longitudinally and reciprocally moveable within the defined longitudinally-extending hollow cavity (vi) or (f) of said hollow screw (v) or (e) for supporting said plug seal mechanism (x) or (n) at the internal end of said rod (p); and moving said plug seal mechanism (x) or (n) to desired position location within the cavity upon reciprocating adjustment movement of said rod (p).

8. An assembly combination apparatus in accordance with that of claim 7, a conduit means formed and provided integral in and as part of said adjuster rod means for passing heat-exchange fluid therethrough into and out of a therewith connected heat exchange zone within the hollow screw of said extruder apparatus.

9. An assembly combination apparatus in accordance with that of either claim 1 or claim 5, wherein each cup-like member (xi) or (o) is a substantially unitary structure having a circumferential wall for engaging the internal cavity wall surfaces of the hollow screw.

10. An assembly combination in accordance with that of either claim 1 or claim 5, wherein each cup-like member (xi) or (o) is a two-piece structure having a piston-like substructure support of flexible metal about which there is circumferentially positioned a resilient washer ring band for engaging the internal cavity wall surfaces of the hollow screw.

11. An assembly combination in accordance with that of claim 10 wherein there is disposed a longitudinally splined construction in the piston-like substructure support of each cup-like member.

12. An assembly combination in accordance with that of either claim 1 or claim 5, wherein each of said plug seal mechanisms (x) or (n) is further characterizable in being free-floating and easily movable within the confines of the cavity void space of the hollow screw when not subject to fluid under pressure within the cavity.

* * * * *